(12) United States Patent
Gelardi et al.

(10) Patent No.: US 8,414,218 B1
(45) Date of Patent: Apr. 9, 2013

(54) SURFACE MARKING SYSTEM FOR VEHICLES

(76) Inventors: Pepin Gelardi, Brooklyn, NY (US);
Teresa Herrmann, Brooklyn, NY (US);
Paul Gelardi, Kennebunkport, ME (US)

( * ) Notice: Subject to any disclaimer, the term of this patent is extended or adjusted under 35 U.S.C. 154(b) by 252 days.

(21) Appl. No.: 12/799,842

(22) Filed: May 3, 2010

Related U.S. Application Data

(60) Provisional application No. 61/215,076, filed on May 1, 2009.

(51) Int. Cl.
*E01C 23/20* (2006.01)

(52) U.S. Cl.
USPC .......................... 404/94; 280/288.4; 222/614

(58) Field of Classification Search .................... 404/93, 404/94, 111; 280/202, 288.4; 222/614
See application file for complete search history.

(56) References Cited

U.S. PATENT DOCUMENTS

| | | | | |
|---|---|---|---|---|
| 339,141 | A * | 4/1886 | Bullard | 111/13 |
| 725,205 | A * | 4/1903 | Blount | 404/94 |
| 1,928,551 | A * | 9/1933 | Ball | 33/264 |
| 2,192,290 | A * | 3/1940 | O'Neal | 156/390 |
| 2,205,713 | A * | 6/1940 | Cain | 280/816 |
| 2,940,421 | A * | 6/1960 | Petterson | 118/308 |
| 3,677,446 | A * | 7/1972 | Guyer et al. | 222/610 |
| 3,976,231 | A * | 8/1976 | Betulius | 222/616 |
| 5,895,072 | A | 4/1999 | Coroneos et al. | |
| 6,722,679 | B2 * | 4/2004 | Englert | 280/288.4 |
| 6,953,376 | B1 * | 10/2005 | Kim et al. | 446/15 |
| 7,163,353 | B2 * | 1/2007 | Ramirez | 404/93 |
| 8,146,947 | B2 * | 4/2012 | Hadley | 280/816 |
| 2010/0171280 | A1 * | 7/2010 | Hadley | 280/87.041 |

* cited by examiner

*Primary Examiner* — Gary S Hartmann
(74) *Attorney, Agent, or Firm* — James Creighton Wray

(57) ABSTRACT

A traveled path marker on a riding vehicle marks a path that the vehicle has traveled with dry particles or liquid from a holder on the vehicle. The marking material flows from a nozzle located near a bottom of the vehicle, or is delivered to a tire which transfers the marking material to the pavement. The path marking alerts following vehicles to an ahead slower moving vehicle or to the paths regularly traveled by slower moving vehicles and encourages similar vehicles to follow those paths. The marked paths also alert pedestrians to shared paths or when crossing bicycle paths.

21 Claims, 16 Drawing Sheets

SURFACE MARKING SYSTEM FOR VEHICLES

This application claims the benefit of U.S. Provisional Application No. 61/215,076, filed May 1, 2009, which is hereby incorporated by reference in its entirety.

FIELD OF THE INVENTION

Disclosed is a vehicle attached surface marking device with the intended use of visualizing and publishing the path of a vehicle.

SUMMARY OF THE INVENTION

The present invention relates to a surface marking system that demonstrates where a vehicle, such as a bicycle, or scooter, has traveled. The intention of this invention is to alert others to the commonly trafficked area. The system consists of the vehicle and an attached marking device. The device permits a marking material to transfer to the ground either through application of the marking material to the rotating wheel of the vehicle, which then transfers the marking substance to the ground. This marking material can be a solid, liquid, powder, solution or any combination thereof. Unlike other marking systems, this system is not intended to mark straight lines or to mark boundaries. Instead, it is designed to highlight the path a particular vehicle has traveled. This resulting mark is called the Contrail of the given vehicle. The mechanism creates a vehicle's Contrail, which can be traveled over by other mechanism users to create multiple Contrails. The device includes a marking substance holder, for containing the marking and includes a system for attaching the device to the vehicle. Disclosed are several embodiments of this system which include various mechanisms for transferring the marking material to the traversed surface. The mechanism may be powered by the vehicle through a drive wheel and gearbox arrangement or it may be battery-operated.

The device leaves a visual mark of vehicle's path. Typically, this will mean bicyclists. The theory is that other vehicle users utilizing shared road spaces will see this path and become aware of the use of this shared space. Bicycle users will be encouraged to bike and drivers and pedestrians will be encouraged to watch out for bicyclists. The images show about a dozen mechanisms for achieving this effect using sidewalk chalk, powdered chalk, liquid chalk, washable paint and/or gypsum.

A rider-propelled vehicle has a frame. A marking medium material holder is connected to the vehicle. A marking medium for marking a travelled path of the vehicle is stored in the holder. A transfer device is connected to the vehicle for receiving the marking medium material from the holder and transferring the marking material medium from the transfer device to paths of travel of the vehicle. One vehicle is a two wheel rider supporting vehicle. The transfer device is a tire on one of the two wheels of the vehicle.

One marking medium material is a dry material, and the holder further includes an advancer for delivering the marking medium material. When the marking medium material is a solid chalk, the advancer is a spring for advancing the solid chalk toward the tire, or the advancer is a wheel connected to the holder for separating dry particulate material from the solid chalk and moving the separated dry particulate material to the transfer device.

The wheel is driven by the tire either directly or through gears. The gears are operated by a battery driven motor or by friction drive from the tire.

One holder is a hollow foraminous wheel in contact with the tire. A holder includes a reservoir mounted on the frame, a wheel contacting the tire and a delivery tube extending between the reservoir and the wheel for delivering the marking medium material from the reservoir to the wheel and from the wheel to the tire. A pump mounted on the frame and connected to the wheel and to the reservoir pumps the marker medium material from the reservoir to the wheel. When the marker medium material is a liquid, the pump pressurizes the reservoir to deliver liquid from the reservoir to the wheel. One pump is a peristaltic pump connected to the wheel for drawing the liquid from the reservoir to the wheel. In one embodiment, the marker medium material is a liquid, and the reservoir is mounted on the frame above a nozzle for flowing the liquid to the wheel by gravity.

In one embodiment, the holder is a reservoir, the marker medium material is a liquid, and the pump is connected to the reservoir for pressurizing the reservoir. A nozzle is mounted on the frame near the tire. A tube is connected between the reservoir and the nozzle, and a valve is mounted on the frame and connected to the tube for selectively permitting or interrupting flow of the liquid from the reservoir to the nozzle.

One holder has a wheel mounted on the holder and contacting the tire. The holder and the wheel are attachable to and removable from or relocatable on the frame for selectively providing or not providing the marking medium material to the tire.

In one embodiment, the transfer device is a nozzle connected to a low part of the bicycle frame. A tube is connected between the nozzle and the holder for delivering the marker medium material from the holder to the nozzle and transferring the marking medium material from the nozzle to a surface beneath the vehicle.

The rider-propelled vehicle is a riding vehicle, a bicycle, a scooter or a car.

These and further and other objects and features of the invention are apparent in the disclosure, which includes the above and ongoing written specification, with the claims and the drawings.

DETAILED DESCRIPTION OF THE DRAWINGS

Figure 1:
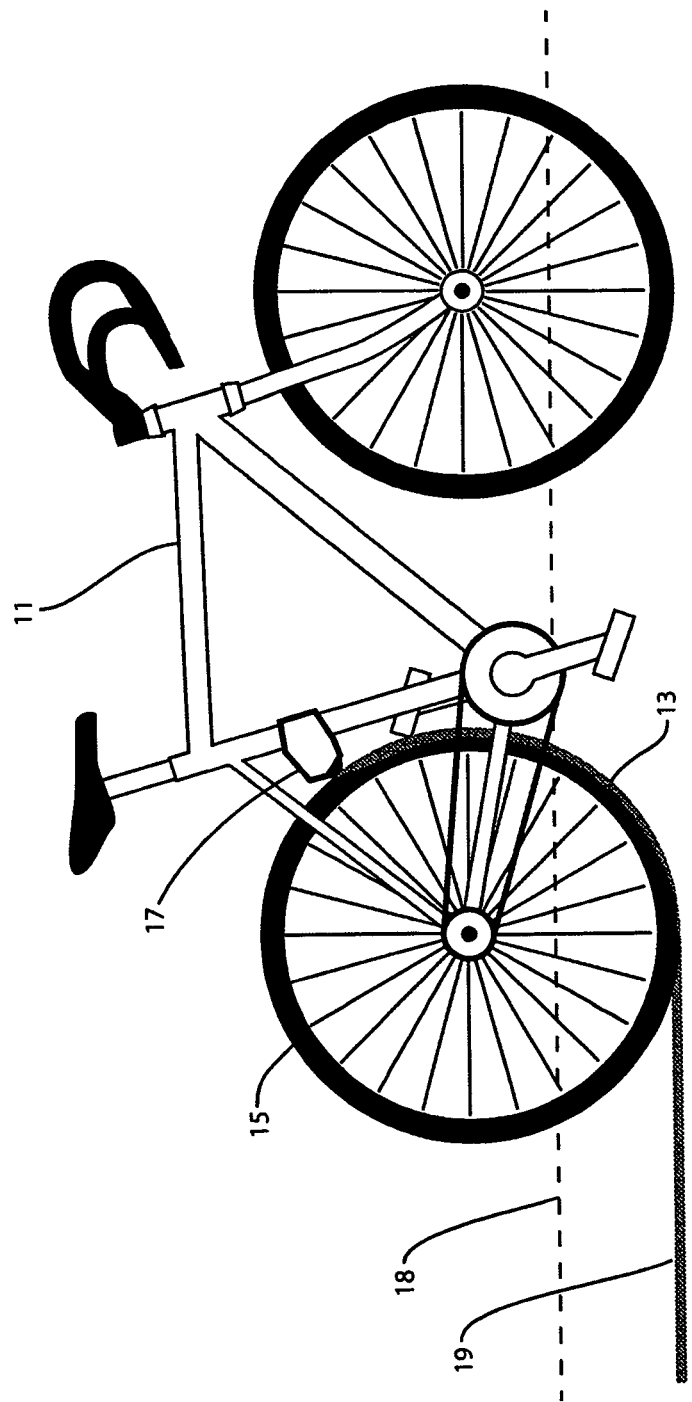
FIG. 1 is a schematic side elevation of a bicycle with a tire marker holder and a mark.

FIG. 1 is an elevation view of the system containing a vehicle 11 with the disclosed device 17 attached. The device transfers a marking material to the tire or outer surface 13 of one of the wheels 15 of the vehicle 11. As the vehicle moves, the wheel transfers the marking material to the traversed surface 18 leaving a visual mark of the path of the vehicle 19.

Figure 2:
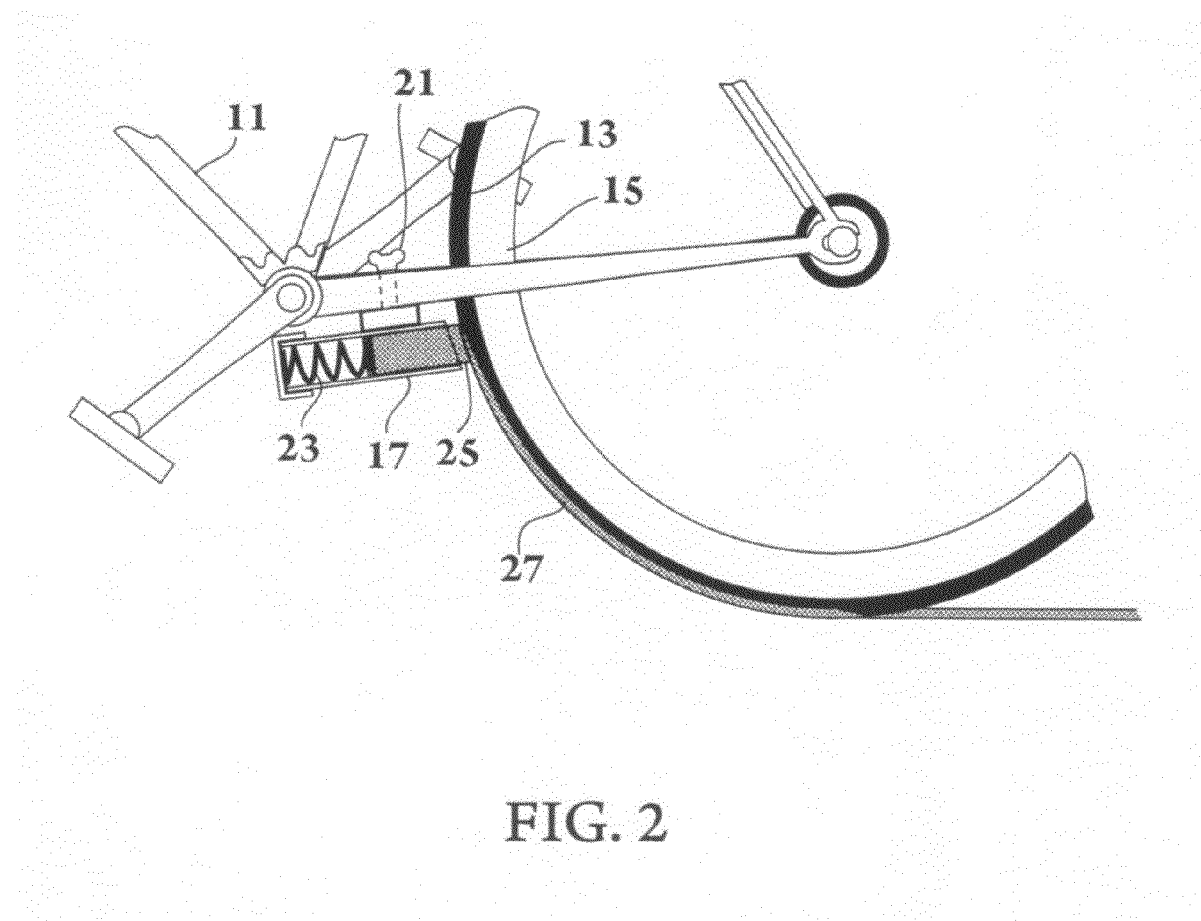
FIGS. 2-15 are side elevational details of tire markers.

FIG. 2 is a section view of a possible embodiment of the device 17. The device is attached to a vehicle 11 by means of clamp, belt or other fastener 21. Solid marking material 25 is pressed against the outer surface 13 of a wheel of the vehicle 15 resulting in a layer of marking material 21. As the wheel 15 rotates, the layer of marking material will be transferred to the traversed surface. The solid marking material 25 is kept in contact with the wheel by means of gravity or a forcing mechanism 23 such as a spring.

Figure 3:
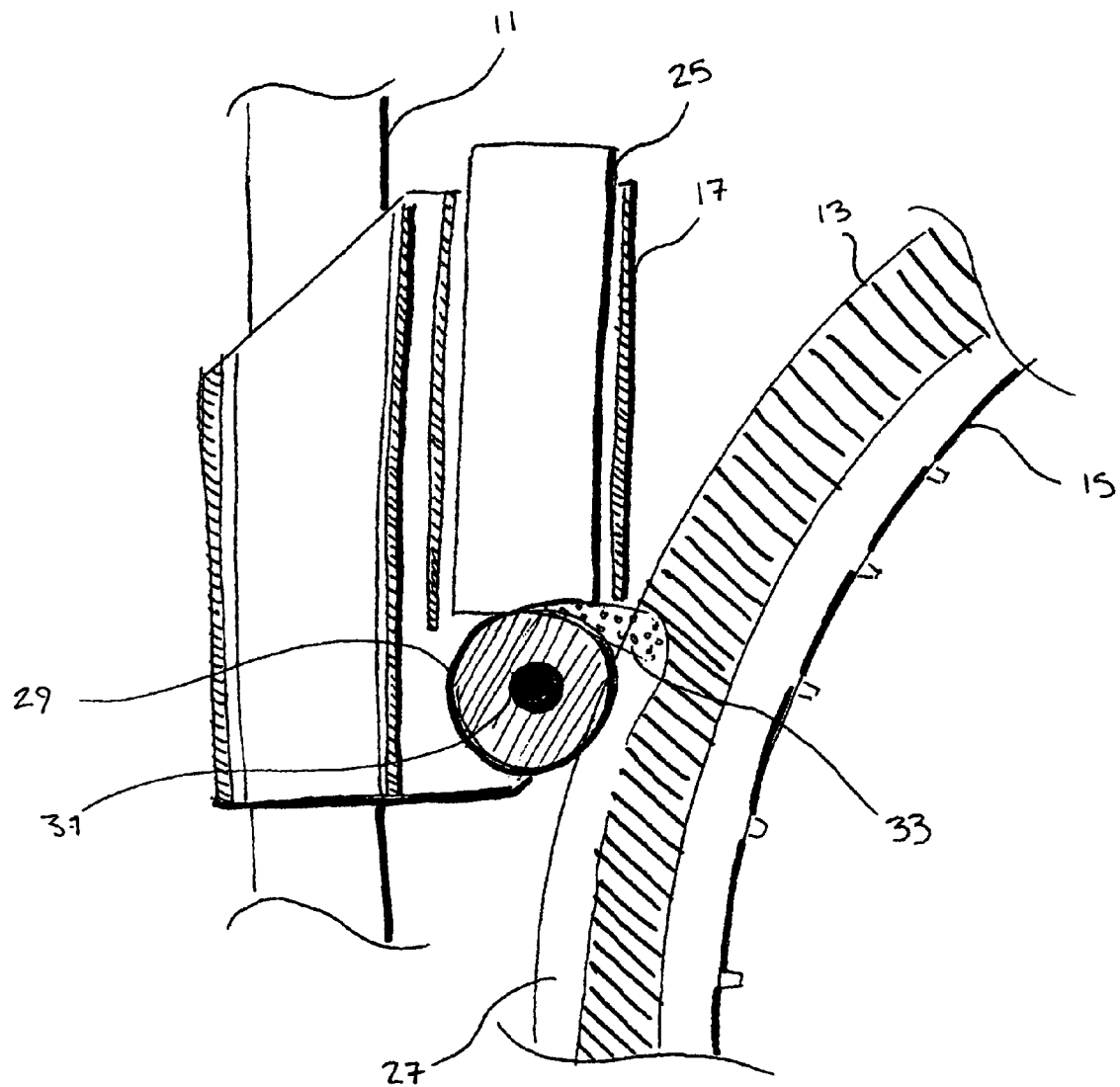

FIG. 3 is a section view of a possible embodiment of the device 17. The device is attached to a vehicle 11 and has a grinding wheel 29 which spins on a bearing 31. The grind wheel 29 is held in contact with the surface 13 of a wheel of the vehicle 15. A solid marking material 25 is held in contact with the grind wheel 29 either by means of gravity or a forcing mechanism. As the wheel 15 rotates, the grind wheel 29 is forced to rotate which removes particles of marking material 33 from the solid marking material 25. The material can either be transferred to the surface of the wheel 13 via the grind wheel 29 or by being accelerated through the air and onto the surface of the wheel. The deposited marking material forms a layer of marking material on the surface of the wheel 27. This in turn is transferred to the traversed surface.

Figure 4:
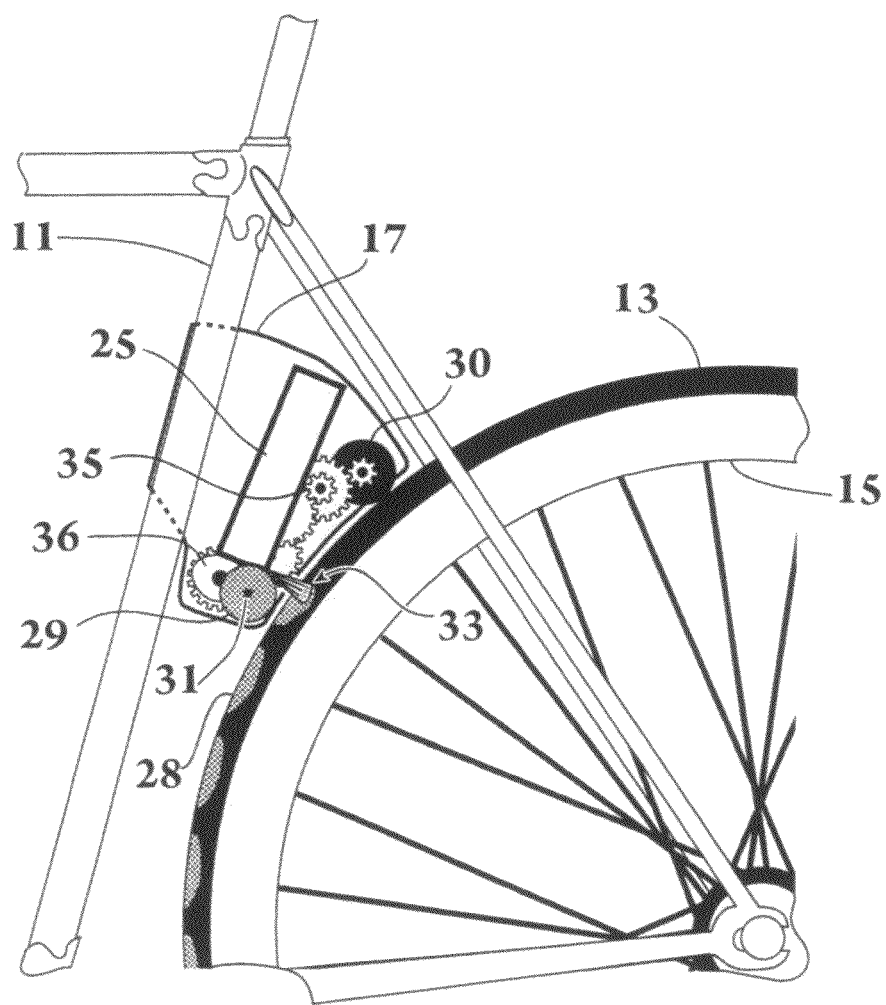

FIG. 4 is a sectional view of a possible embodiment of the device 17 connected to a vehicle 11 containing a drive wheel 30, a clockworks 35 and a grinding wheel 29. In this device, the surface of the wheel of the vehicle 13 is in contact with drive wheel 30 which rotates with the vehicle wheel. Power is transferred from the drivewheel 30 through a clockworks 35 to a grindwheel 29 which rotates around an axle 31. A piece of solid marking material 25 is held against the grinding wheel 29. As the grindwheel rotates, it removes material from the solid marking material 25 and deposits it on the surface of the wheel 13. The grinding wheel spins at such a rate as to propel the marking material through the air 33 and onto the surface of the wheel 13 creating a layer of marking material 28. A cam 36 can be incorporated into the device and driven by the clockworks 35. As the drivewheel rotates, the cam lifts the solid marking material 25 away from the grinding wheel 29 and then returns the marking material 25 to contact with the spinning grinding wheel 29. This results in intermittent removal of material. The resulting layer of material 28 will be interrupted. Marking material is then deposited upon the ground by means of the rotating wheel.

Figure 5:
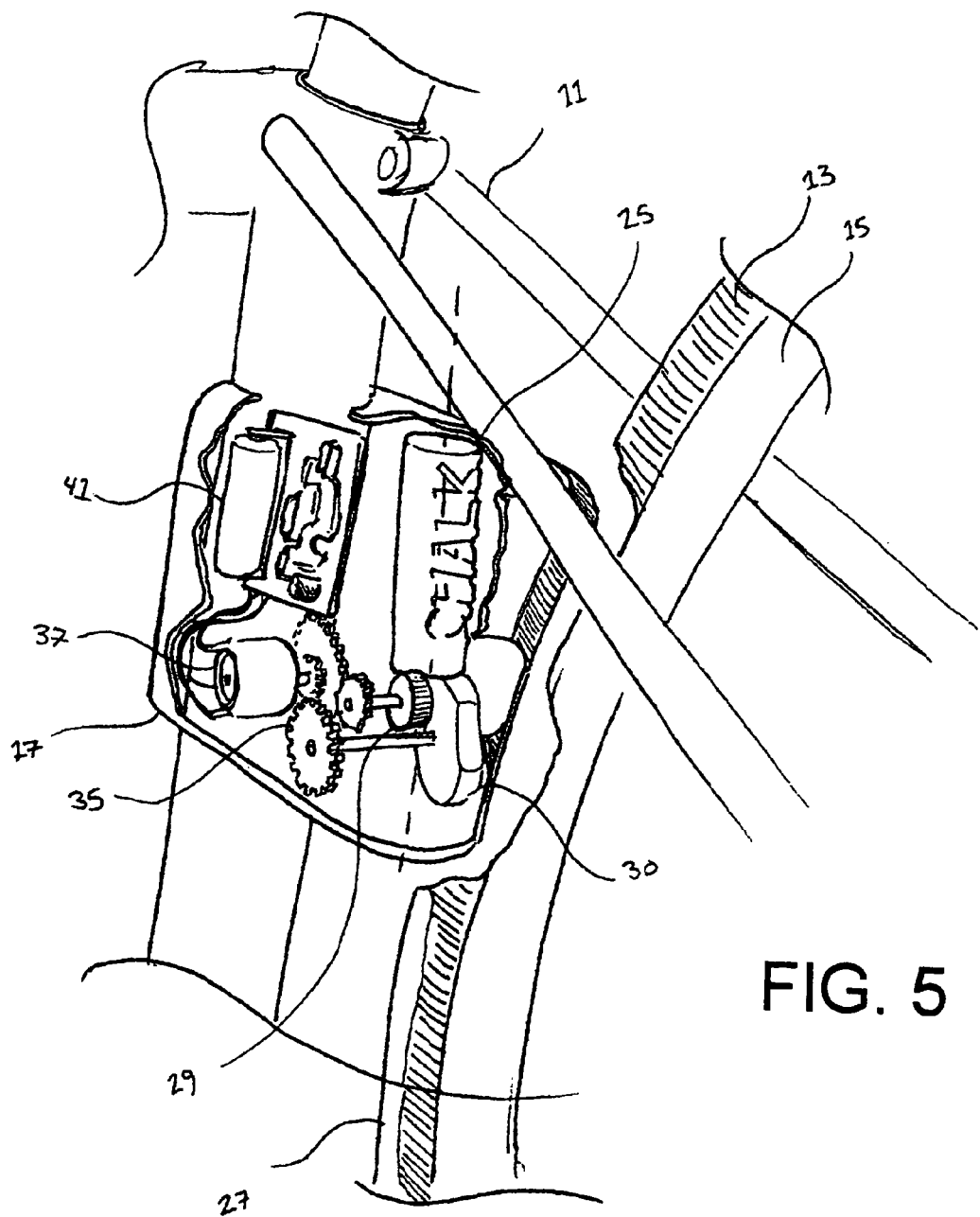

FIG. 5 is a cutaway view of a possible implementation of the device 17 connected to a vehicle 11 containing a motorized system for delivering marking material. A motor 37 powered by a battery and circuit 41 powers a clockworks 35 which, in turn, powers a grind wheel 29 and a cam wheel 30. The grind wheel propels material from a stick, rod or block of solid marking material 25 on to the surface 13 of a wheel 15 of the vehicle creating a layer of marking material 27. The cam 30 lifts and lowers the marking material 25 allowing the system to create intermittent deposits of marking material on the surface of the wheel 13. As the wheel 15 rotates, marking material is transferred onto the traversed surface.

Figure 6:
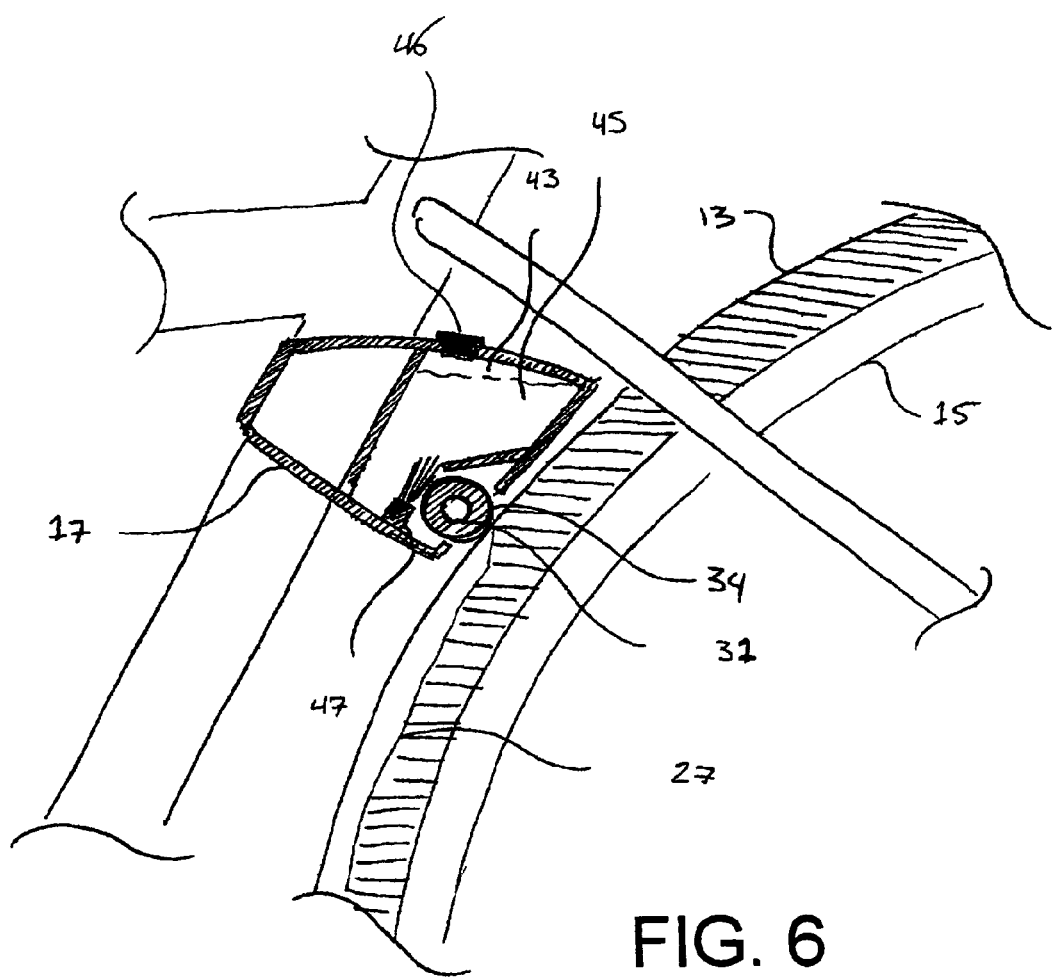

FIG. 6 is a section view of a possible embodiment of the marking device 17 attached to the vehicle 11 featuring a reservoir 43 containing a flowing marking material 45 such as powdered chalk, tempera paint, or other solution. The reservoir can be refilled through a port which is closed off by a cap 46. The marking material is filtered through a brush 47 and onto a transfer wheel 34. The transfer wheel is kept in contact with the surface 13 of a wheel of the vehicle 15 which is in rotation. The marking material is transferred to the surface of the vehicle wheel 13 and, in turn, is transferred the traversed surface. The transfer wheel 34 may be in contact with the filter brush 47 and can be used to agitate said brush to promote the movement of the marking material through the bristle of the brush.

Figure 7:
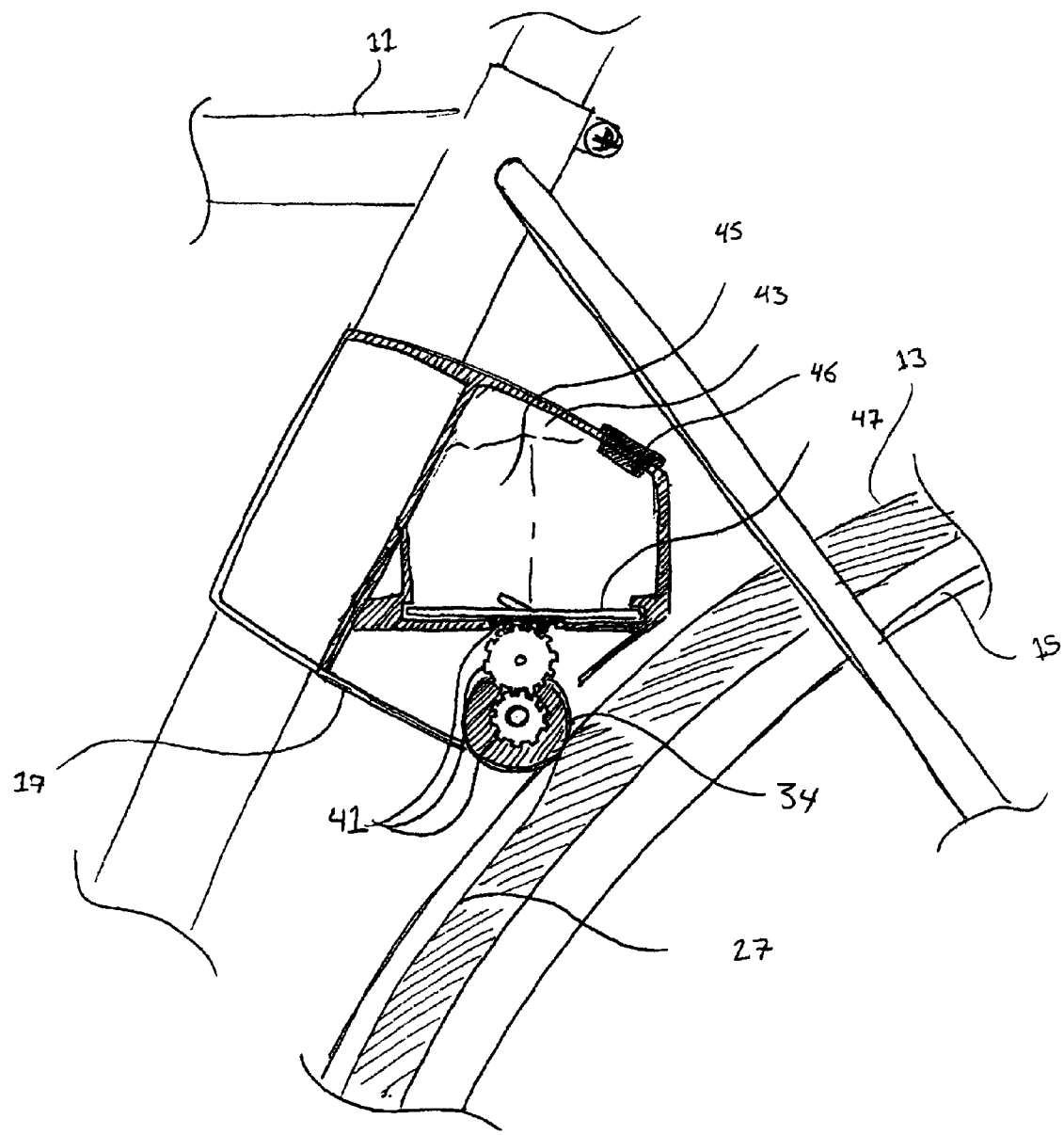

FIG. 7 is a section view of a possible embodiment of the marking device 17 attached to the vehicle 11 featuring a reservoir 43 containing a flowing marking material 45 such as powdered chalk, tempera paint, or other solution. The reservoir can be refilled through a port which is closed off by a cap 46. A transfer wheel 34 is kept in contact with the surface of the vehicle wheel 13 which is in rotation. The transfer wheel powers a clockworks 41 which spins a sifting plate 44. As the sifting plate spins, it allows particles of marking material to fall onto the transfer wheel, or alternately, directly onto the surface 13 of the wheel 15. The marking material collects in a layer 27 on the surface of the wheel. The wheel of the vehicle 13 then rotates and applies this marking material to the traversed surface.

Figure 8:
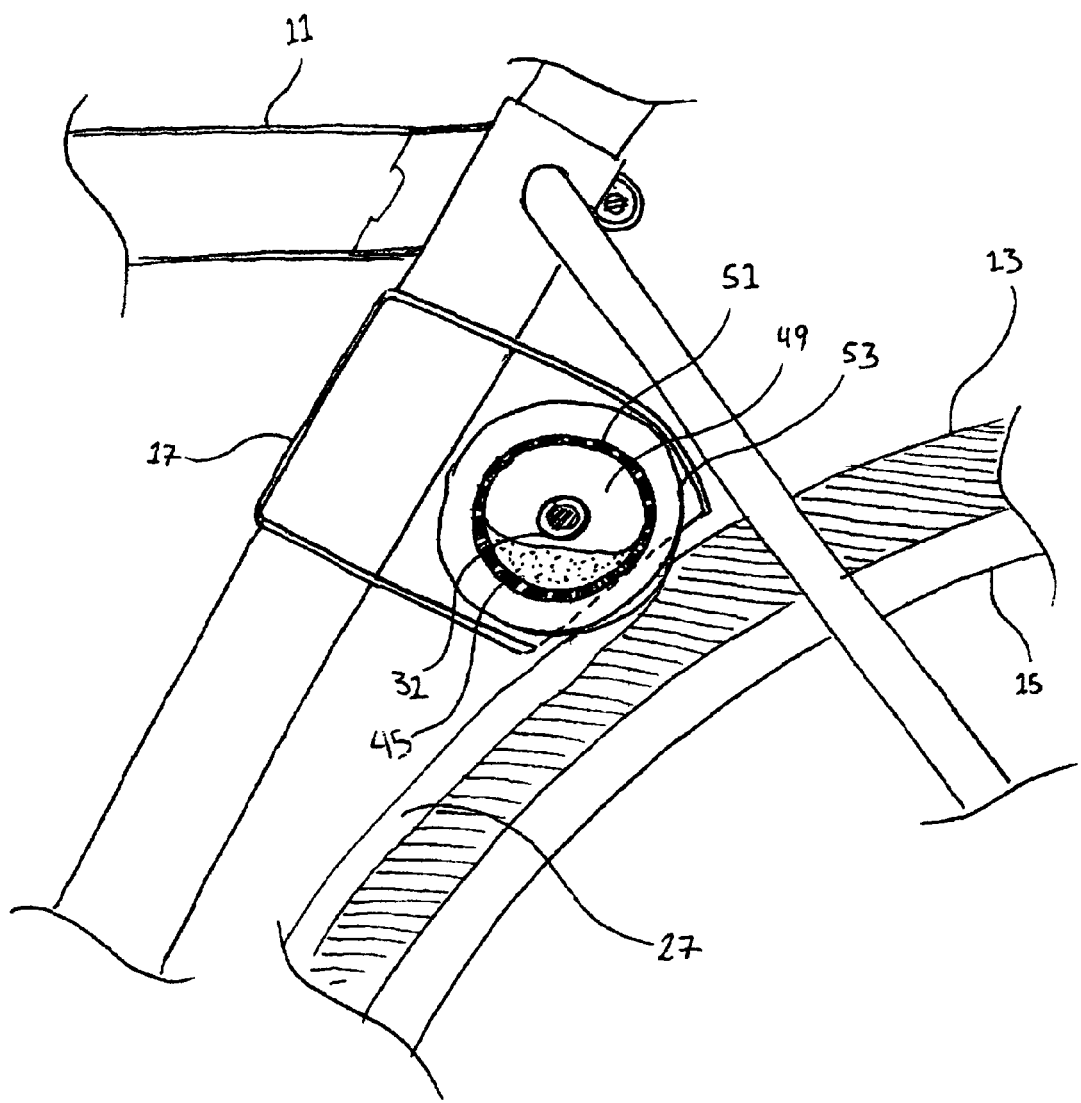

FIG. 8 is a section view of a possible embodiment of the marking device 17 attached to the vehicle 11 featuring an integrated transfer wheel 53 which is made of a porous material and contains a reservoir 49 for liquid, powder or a solution of marking material 45. The reservoir is fully contained except for small holes 51 along the radial wall. As the vehicle wheel 15 spins, the integrated transfer wheel 53 is forced to rotate. The inside wall of the reservoir spins with the integrated transfer wheel and causes the contained marking material 45 to spin. The material accelerates through small holes in the wall of the reservoir, and through the outer wall of the porous transfer wheel 53. The integrated transfer wheel then transfers material onto the surface of the vehicle wheel 13.

Figure 9:
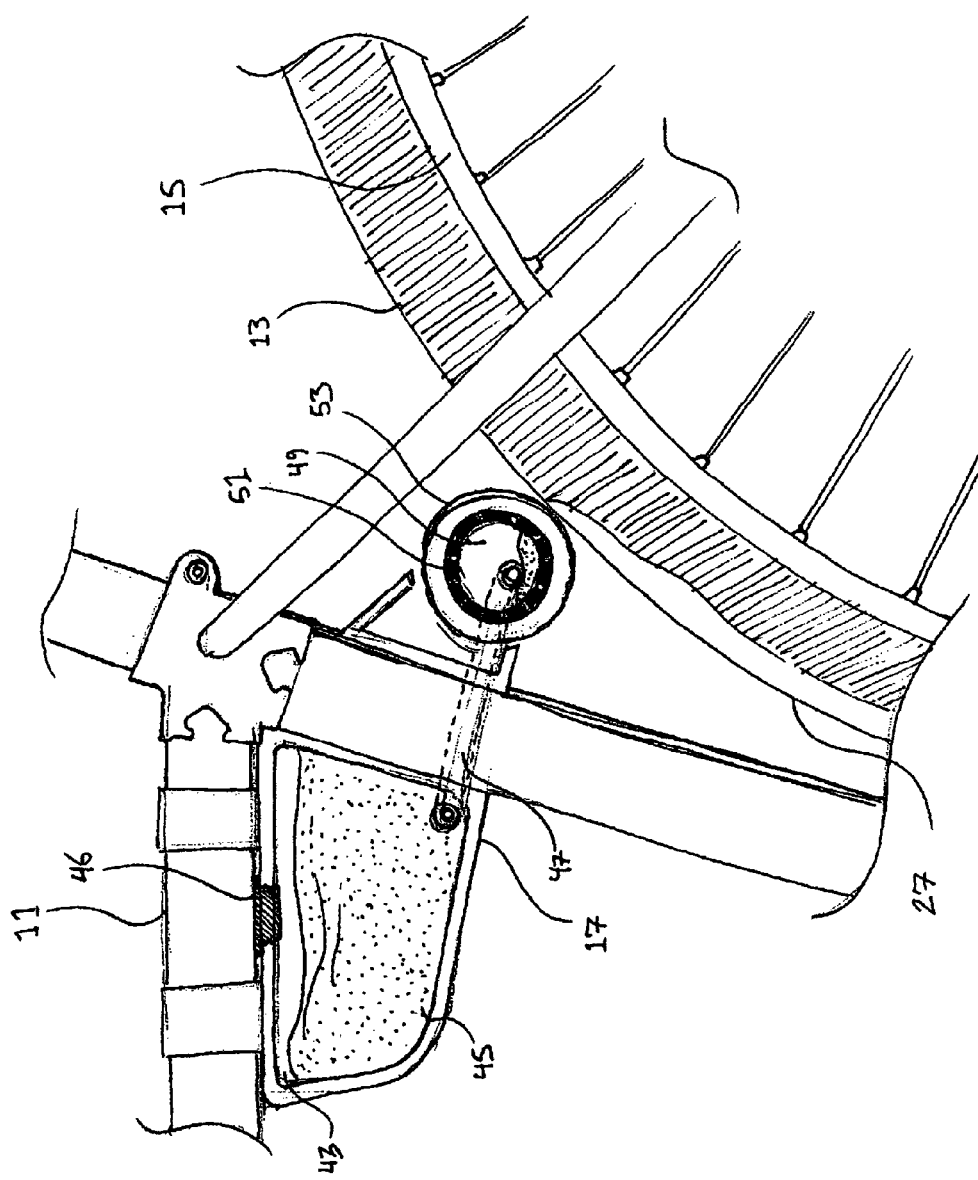

FIG. 9 is a section view of a possible embodiment of the marking device similar to that described in FIG. 8. In this embodiment, however, the primary material reservoir 43 is external to the integrated transfer wheel 53. Marking material 45 flows through a pipe 47 from the primary reservoir 43 to a reservoir within the integrated transfer wheel 53.

Figure 10:
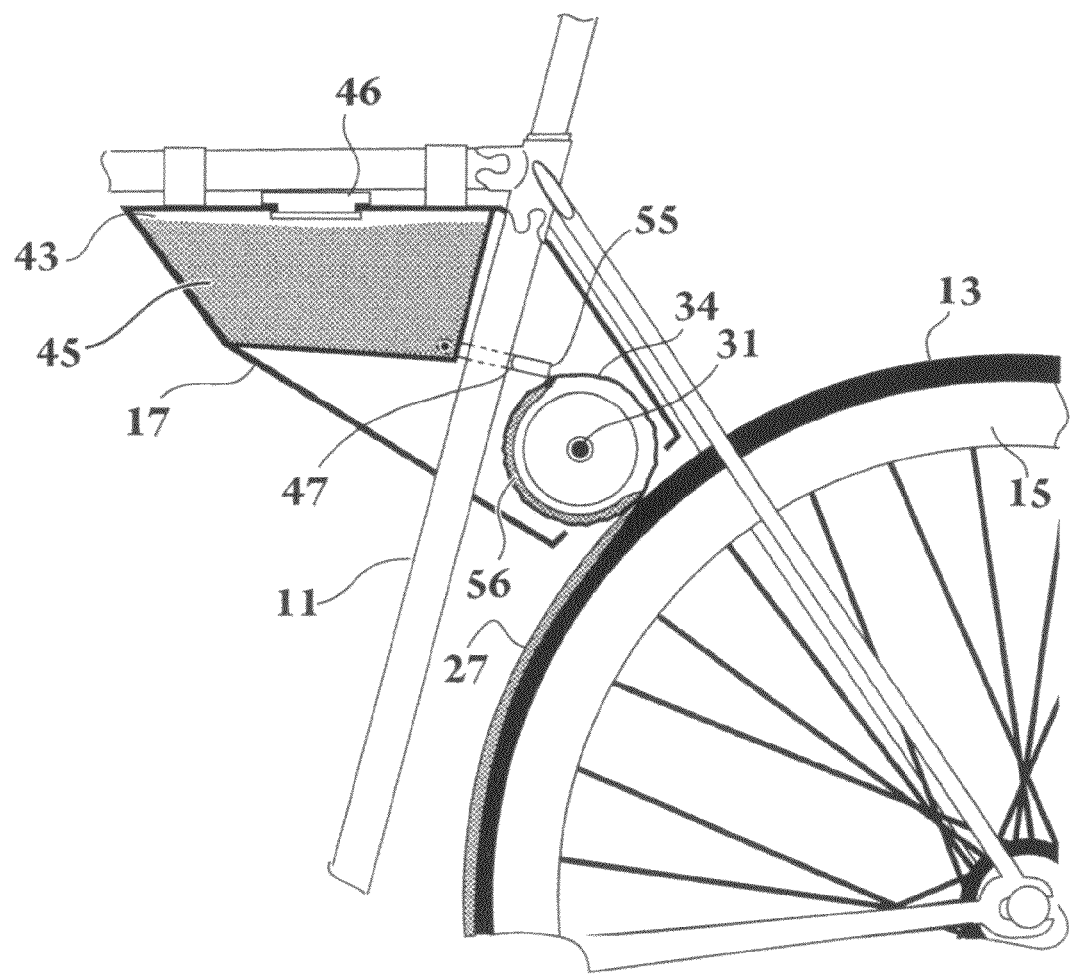

FIG. 10 is a section view of a possible embodiment of the marking device 17 attached to the vehicle 11 featuring a transfer wheel 34 and a reservoir of material 43. A flowing marking material 45 passes through a pipe 47 and onto the transfer wheel 56. The flowing marking material drips onto the transfer wheel through a spout 55 in a controlled fashion. As the vehicle moves forward, and the specified wheel of the vehicle 15 rotates, the transfer wheel, which is in contact with the wheel of the vehicle, rotates. The marking material evenly coats the transfer wheel 34 which in turns transfers marking material to the surface of the wheel of the vehicle 13 forming a layer of marking material on the wheel 27. The wheel of the vehicle 15 then rotates and applies this marking material to the traversed surface.

Figure 11:
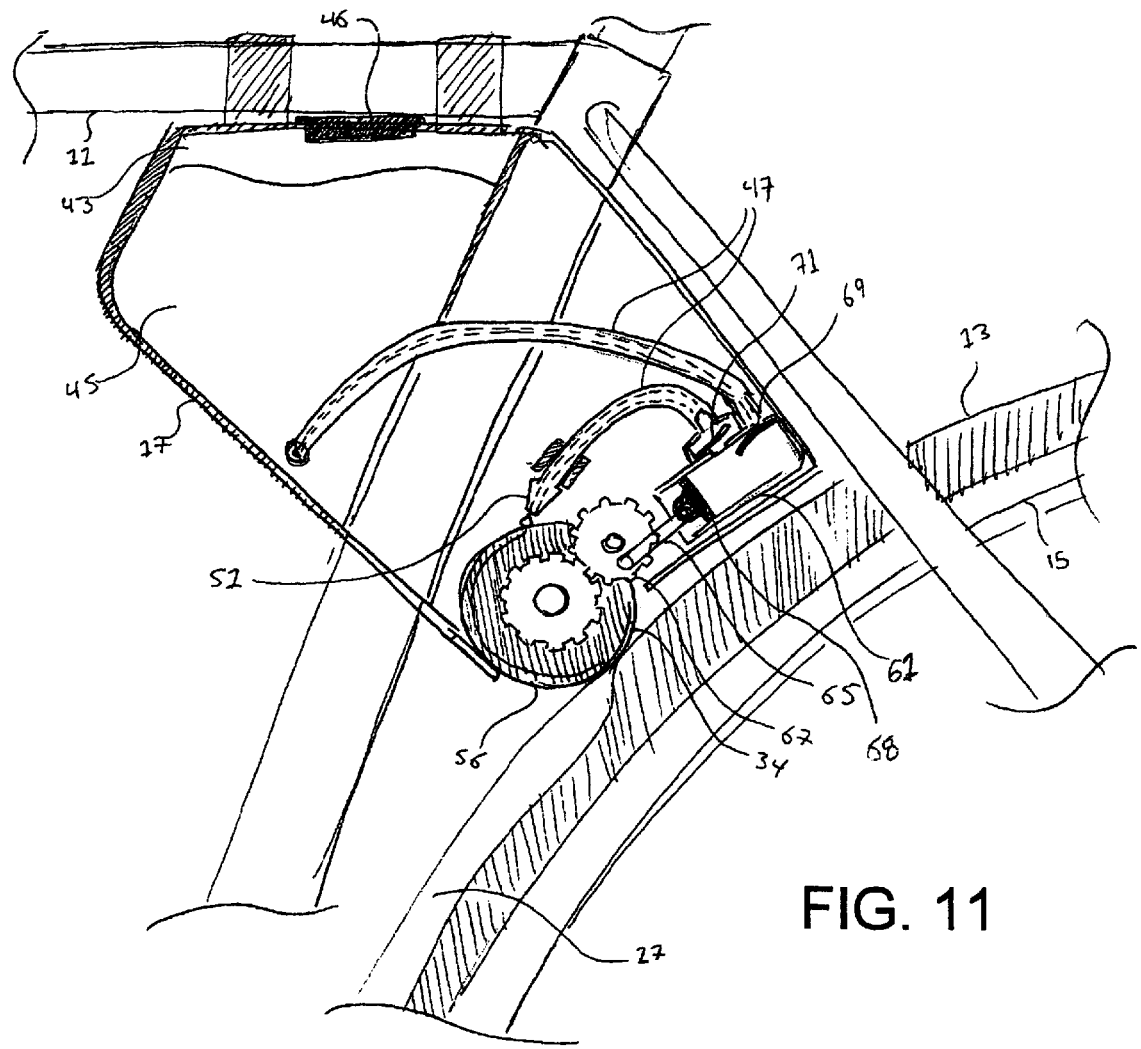

FIG. 11 is a section view of a possible embodiment of the marking device 17 attached to the vehicle 11 consisting of a reservoir 43 containing flowing marking material 45, a fluid pump 61 and a transfer wheel 34. The transfer wheel is held in contact with the surface 13 of the vehicle wheel 15. As the vehicle moves forward and the wheel 15 rotates, the transfer wheel 34 spins transferring power to a clockworks 67. A forebar 65 attached to an off center shaft attached to a gear in the clockworks 67 moves a plunger 68 in a cyclical fashion. As the plunger recedes in the pump 61, the inlet valve 69 opens and the outlet valve 71 closes drawing marking material 45 through a pipe 47 into the pump chamber. As the plunger 68 moves forward, marking material is forced into the continuation of the pipe 47 and out a nozzle 51. This nozzle is position over the transfer wheel 34 or directly above the surface 13 of the vehicle wheel 15. As the transfer wheel spins, the accumulated material 56 is transferred to the wheel of the vehicle creating a layer of marking material on the vehicle wheel 27. The wheel of the vehicle 15 then rotates and applies this marking material to the traversed surface.

Figure 12:
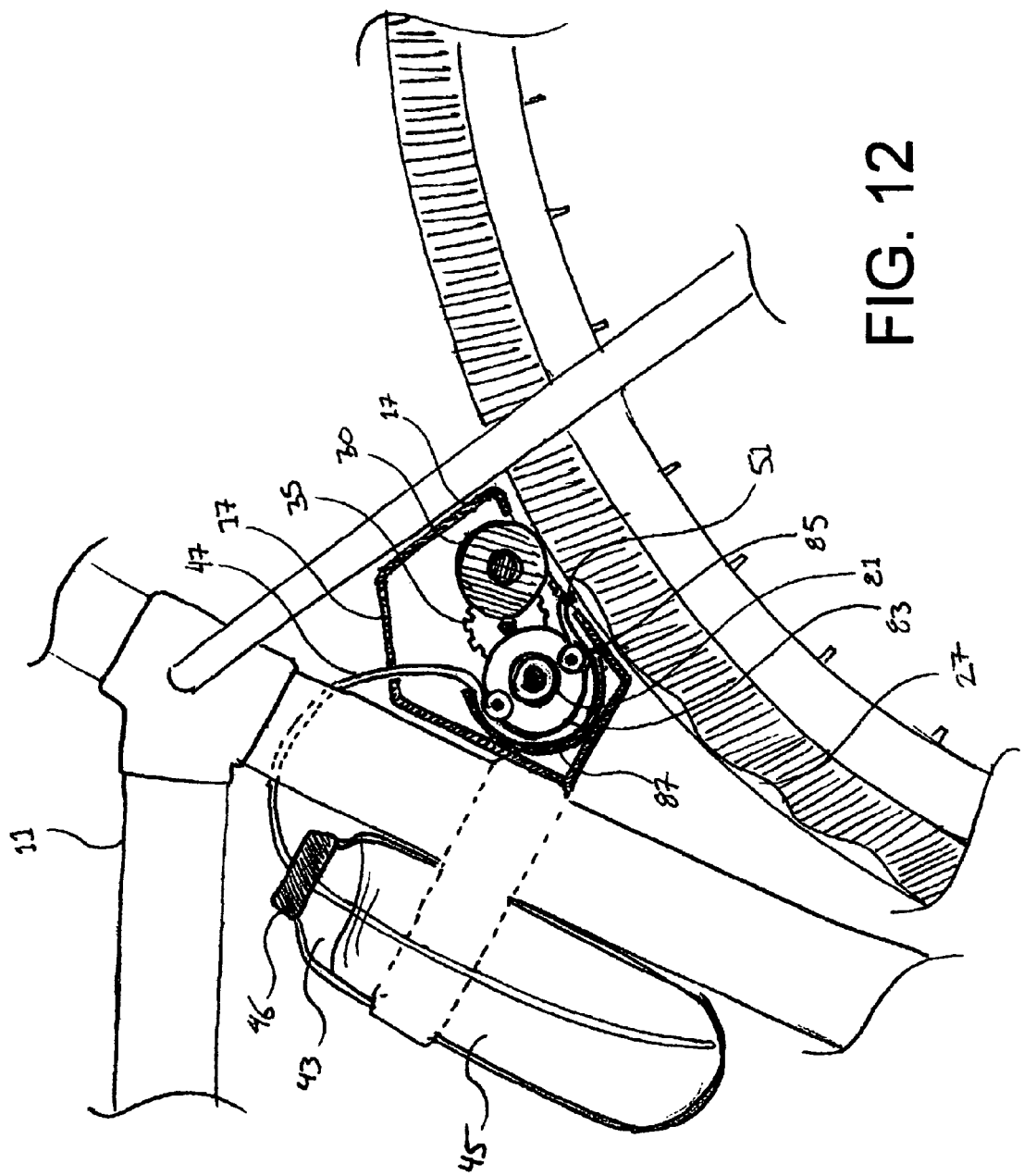

FIG. 12 is a section view of a possible embodiment of the marking device 17 attached to the vehicle 11 consisting of an external reservoir 43 containing a liquid or solution marking material 45, a drive wheel 30 a clockworks 35 and a peristaltic pump 83. The peristaltic pump consists of a central wheel, multiple compression wheels 85 and a back wall 87. When the drive wheel 30 rotates, the connected clockworks 35 transfers power to the peristaltic pump 83. The peristaltic pump rotates pressing the elastic feed tube 47 between the pressure wheel 85 and the back wall 87 which collapses the wall of the tube. As the pressure wheels move from the region of the tube closest to the reservoir toward the spray tip 51, a vacuum is created behind the wheel position and a pressure front is created in front of the wheel position. In this way, liquid is forced through the tube toward the spray tip 51. Marking material exits the spray tip 51 and collects on the surface 13 of the vehicle wheel 15 in a layer 27. The wheel of the vehicle 15 then rotates and applies this marking material to the traversed surface. The reservoir is refillable through a cap 46.

Figure 13:
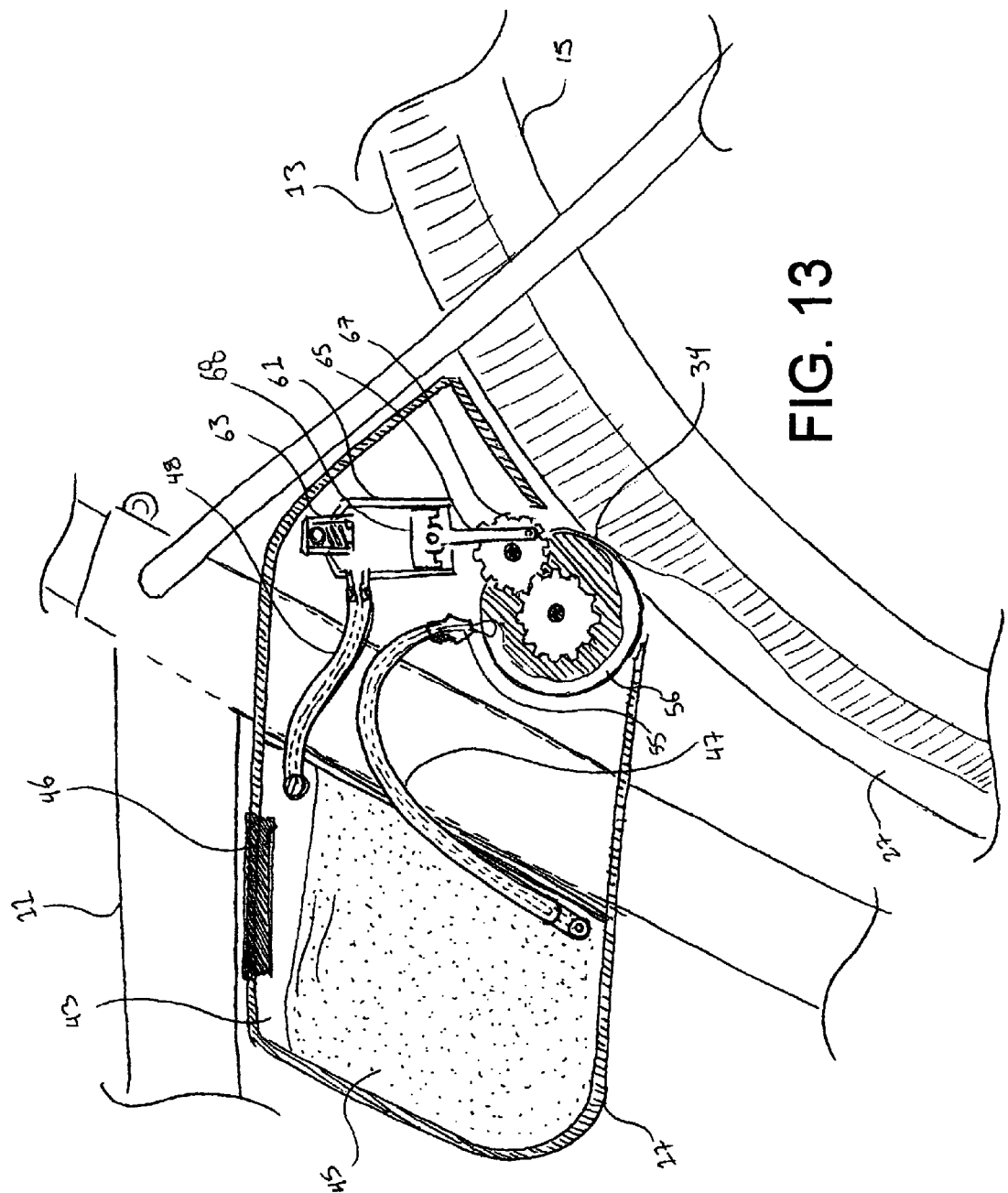

FIG. 13 is a section view of a marking device similar to FIG. 11. However, in this embodiment, the pump 61 draws air through a check valve 63 and then injects it via an air tube 48 on the compression stroke of the pump. The reservoir 43 is air tight and, when air is added, the pressure forces the flowing marking material 45 through the feed tube 47 and onto the transfer wheel 34 or directly onto the surface 13 of the vehicle wheel 15.

Figure 14:
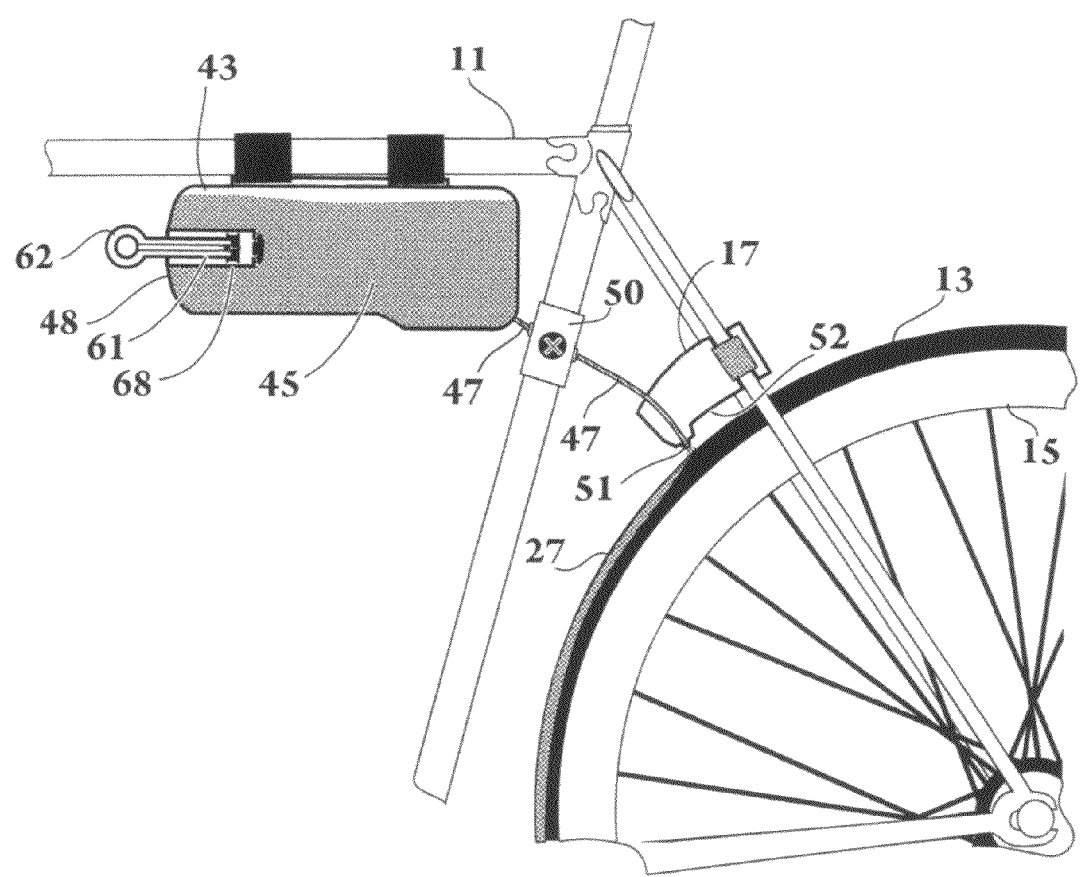

FIG. 14 is a section view of a possible embodiment of the marking device 17 attached to the vehicle 11 consisting of a reservoir 43 containing flowing marking material and a cap 48 with a pump 61 and a spray head 52. In this design the user manually primes the system by pumping the handle 62 on the cap 61 several times. This forces air into the reservoir 43 pressurizing this chamber. A release valve 50 on the feed tube 47 controls the flow of marking material 45 from the reservoir 43 to the spray nozzle 51. The spray nozzle 51 is held in place above the vehicle wheel surface 13 by means of a holder 52. When the valve 50 is partially or fully open, marking material 45 will flow from the reservoir 43 to the spray head 51 and onto the surface of the vehicle wheel 13. As the wheel 15 rotates, the marking material will be transferred to the traversed surface.

Figure 15:
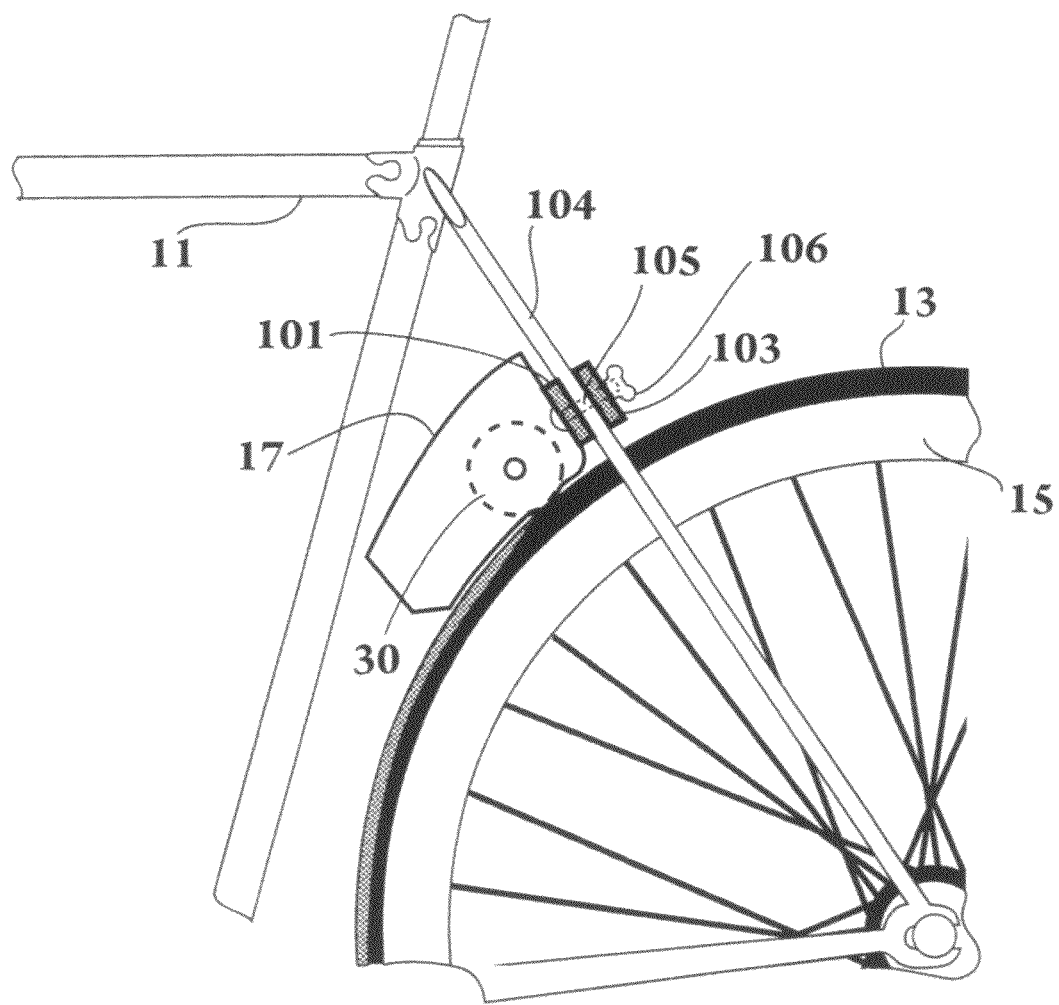

FIG. 15 is an elevation view of the preferred system of attachment for the device 17 to the vehicle 11. In this system, the vehicle is assumed to be a bicycle or similar 2 wheeled vehicle. In a system where the wheel is supported by two separate stays, tubes, posts or rods on either side of the wheel 104, the device 17 can be mounted on one side of the stays and a bracket 103 can be placed on the other side of the stays 104. A connecting bolt 105 is firstly attached to a boss 101 on the device 17, passes between the stays 104 and through the bracket 103. A nut 106 holds the assembly together and, in conjunction with the bolt 105 compresses the device 17 and the bracket 103 against the stays preventing the device 17 from shifting. Additionally, if the device employs a driving wheel 30, that element may rest on the wheel providing additional support for the device.

Figure 16:
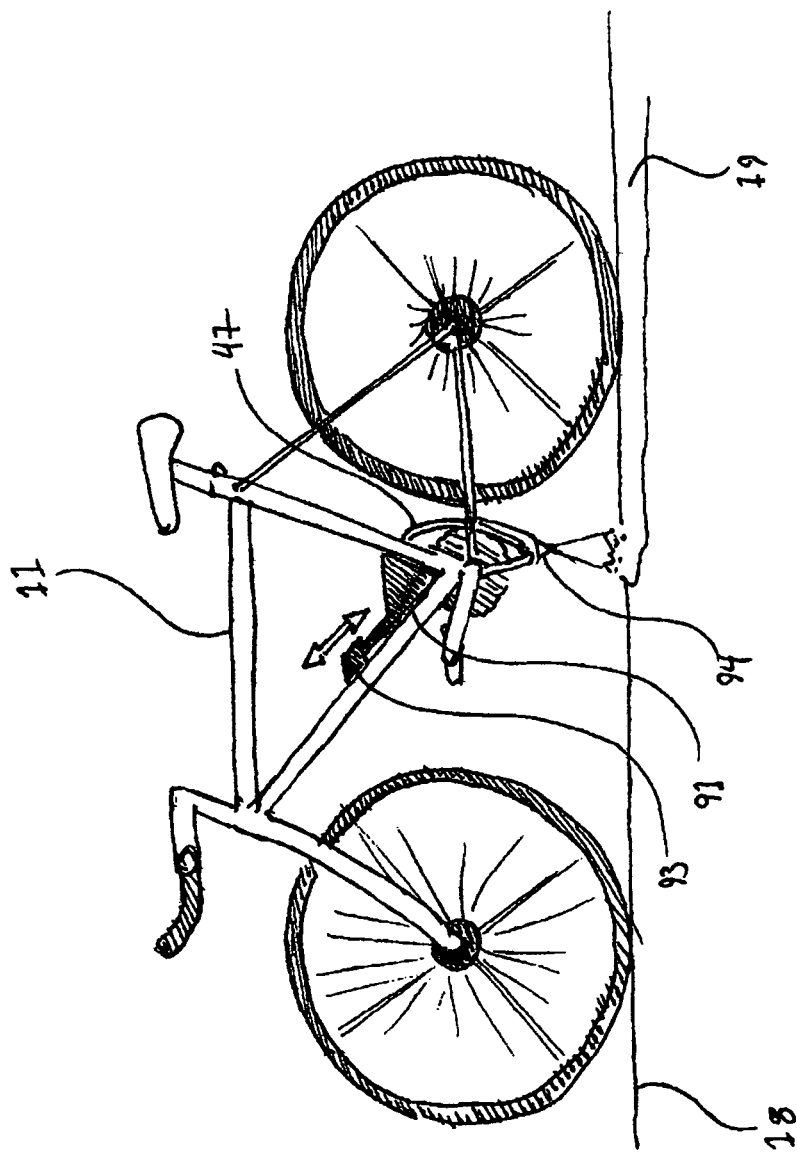
FIG. 16 is a schematic side elevation of a bicycle with a path marker.

FIG. 16 is an elevation view of the system featuring a vehicle 11 and a device 91 with a pressurizing system 93 a release nozzle 94 and a feed tube 47. In this system, the device is pressurized manually, through a battery powered pump, or through the energy of the vehicle. The pressure in turn, forces marking material from the device 91 through the feed tube 47, out the nozzle 94 and onto the traversed surface 18 leaving a mark 19 of the path the vehicle has just traversed.

While the invention has been described with reference to specific embodiments, modifications and variations of the invention may be constructed without department from the scope of the invention, which is defined in the following claims.

The invention claimed is:

1. Apparatus comprising a rider-propelled vehicle having a frame, a marking medium material holder connected to the vehicle, a marking medium in the holder for marking a travelled path of the rider-propelled, vehicle and a transfer device connected to the frame and connected to the holder for transferring the marking medium from the holder to the transfer device and from the transfer device to paths of travel of the rider-propelled vehicle, wherein the rider-propelled vehicle two wheel vehicle, the transfer device is a tire on one of the two wheels of the rider-propelled vehicle.

2. The apparatus of claim 1, wherein the marking medium material is a liquid material, and the holder further comprises an advancer for delivering the marking medium material.

3. The apparatus of claim 2, wherein the marking medium material is a liquid chalk, and the advancer is a tube for advancing the liquid chalk toward the tire.

4. The apparatus of claim 2, wherein the marking medium is a liquid, and the advancer is a wheel connected to the holder for separating material from the holder and moving the material to the tire.

5. The apparatus of claim 4, wherein the wheel is driven by the tire.

6. The apparatus of claim 1, wherein the holder is a hollow foraminous wheel in contact with the tire.

7. The apparatus of claim 1, wherein the holder further comprises a reservoir mounted on the frame and further comprising a wheel contacting the tire and a delivery tube extending between the reservoir and the wheel for delivering the marking medium material from the reservoir to the wheel.

8. The apparatus of claim 7, further comprising a pump mounted on the frame and connected to the wheel and to the reservoir for pumping the marker medium material from the reservoir to the wheel.

9. The apparatus of claim 8, wherein the marker medium material is a liquid and the pump pressurizes the reservoir to deliver liquid from the reservoir to the wheel.

10. The apparatus of claim 7, wherein the marker medium material is a liquid and wherein the pump is a peristaltic pump connected to the wheel for drawing the liquid from the reservoir to the wheel.

11. The apparatus of claim 7, wherein the marker medium material is a liquid and the reservoir is mounted on the frame above the wheel for flowing the liquid to the wheel by gravity.

12. The apparatus of claim 1, wherein the holder is a reservoir, the marker medium material is a liquid and further comprising a pump connected to the reservoir for pressurizing the reservoir, a nozzle mounted on the frame near the tire, a tube connected between the reservoir and the nozzle and a valve mounted on the frame and connected to the tube for selectively permitting or interrupting of the liquid through the tube from the reservoir to the nozzle.

13. The apparatus of claim 1, wherein the holder further comprises a wheel mounted on the holder and contacting the tire, the holder and wheel being attachable to and removable from or relocatable on the frame for selectively providing or not providing the marking medium material to the tire.

14. The apparatus of claim 1, wherein the frame is a bicycle frame and the transfer device comprises a nozzle connected to a low part of the frame and a tube connected between the nozzle and the holder for delivering the marker medium material from the holder to the nozzle and transferring the marking medium material from the nozzle to a surface beneath the vehicle.

15. The apparatus of claim 1, wherein the rider-propelled vehicle is a riding vehicle, a bicycle, a scooter or a car.

16. A method of using the apparatus of claim 1, the method comprising marking the path of the riding vehicle with the marking medium by mounting the marking medium holder on the riding vehicle, storing the marking medium in the holder, metering and dispensing the marking medium from the holder and transferring the metered and dispensed marking medium to the path on a surface on which the riding vehicle travels.

17. The method of claim 16, wherein the riding vehicle is a bicycle, scooter or truck having a tire, wherein the transferring comprises applying the marking medium to the tire and leaving the marking medium on the surface as the tire contacts, presses and leaves the surface.

18. The method of claim 17, wherein the metering and dispensing comprise rotating a wheel on the tire and moving the marking medium to the tire with the wheel.

19. The method of claim 16, wherein the marking medium is a liquid and the metering and dispensing comprise flowing the liquid through a tube to a nozzle or wheel by pressure differential of gravity or a pump.

20. The method of claim 16, wherein the marking material is a liquid and the metering comprises removing material from the solid and dispensing the material to the transferring.

21. The method of claim 17, wherein the transferring comprises releasing the marking material from a nozzle connected by a tube to the holder.

\* \* \* \* \*